US008153407B2

(12) United States Patent
Schweitzer et al.

(10) Patent No.: US 8,153,407 B2
(45) Date of Patent: Apr. 10, 2012

(54) PROCESS FOR PRODUCING A TRIGLYCERIDE

(75) Inventors: Erik Johannes Anton Schweitzer, Wormerveer (NL); Frederick William Cain, Voorburg (NL); Ulrike Schmid, Wormerveer (NL)

(73) Assignee: Loders Croklaan B.V., Wormerveer (NL)

( * ) Notice: Subject to any disclaimer, the term of this patent is extended or adjusted under 35 U.S.C. 154(b) by 795 days.

(21) Appl. No.: 11/991,610

(22) PCT Filed: Sep. 8, 2006

(86) PCT No.: PCT/GB2006/003343
§ 371 (c)(1),
(2), (4) Date: Dec. 5, 2008

(87) PCT Pub. No.: WO2007/029018
PCT Pub. Date: Mar. 15, 2007

(65) Prior Publication Data
US 2009/0130728 A1  May 21, 2009

(30) Foreign Application Priority Data

Sep. 8, 2005  (EP) .................................... 05255492

(51) Int. Cl.
*C12P 7/64* (2006.01)
(52) U.S. Cl. ........ 435/134; 426/601; 426/606; 426/607; 514/560; 554/163
(58) Field of Classification Search .................. 435/134; 426/601, 606, 607; 554/163; 514/560
See application file for complete search history.

(56) References Cited

U.S. PATENT DOCUMENTS

| 3,870,807 | A  | * | 3/1975  | Baltes ............................ 426/417 |
| 5,306,516 | A  | * | 4/1994  | Letton et al. .................. 426/531 |
| 5,658,768 | A  |   | 8/1997  | Quinlan ......................... 435/134 |
| 6,090,598 | A  |   | 7/2000  | Yamaguchi et al. .......... 435/134 |
| 6,297,279 | B1 |   | 10/2001 | Wang et al. |
| 7,927,647 | B2 | * | 4/2011  | Andou et al. .................. 426/606 |
| 2004/0126475 | A1 |   | 7/2004  | Hashizume et al. .......... 426/601 |
| 2006/0105090 | A1 |   | 5/2006  | Cain et al. |

FOREIGN PATENT DOCUMENTS

| EP | 0 209 327      | 1/1987  |
| EP | 0 417 923 A2   | 3/1991  |
| EP | 0 496 456 A1   | 7/1992  |
| EP | 0776357        | 6/1997  |
| EP | 0698078        | 8/1997  |
| EP | 0 882 797 A2   | 12/1998 |
| EP | 1038444        | 9/2000  |
| EP | 1 477 070 A1   | 11/2004 |
| GB | 1 577 933      | 10/1980 |
| GB | 2178752        | 2/1987  |
| WO | WO 94/10326    | 5/1994  |
| WO | WO 96/19115    | 6/1996  |
| WO | WO 2005/003365 | 1/2005  |
| WO | WO 2005/036987 | 4/2005  |
| WO | WO 2005/037373 A1 | 4/2005 |
| WO | WO 2006/114791 A1 | 11/2006 |
| WO | WO 2008/104381 | 9/2008  |

OTHER PUBLICATIONS

Chen et al., "Synthesis of the structured lipid 1,3-Dioleoyl-2-palmitoylglycerol from palm oil", Journal of the American Oil Chemists' Society, 81(6):525-532 (Jun. 2004).
Schmid et al., "Highly Selective Synthesis of 1,3-Oleoyl-2-Palmitoylglycerol by Lipase Catalysis", Biotechnology and Bioengineering, 64(6):678-684 (Sep. 20, 1999).
Quinlan et al., "Modification of triglycerides by lipases: process technology and its application to the production of nutritionally improved fats", Inform., 4(5):580-585 (May 1993).
Nagao et al., "Use of Thermostable *Fusarium heterosporum* Lipase for Production of Structured Lipid Containing Oleic and Palmitic Acids in Organic Solvent-Free System", JAOCS, 78(2):167-172 (2001).
Ghazali et al., "Enzymatic Transesterification of Palm Olein with Nonspecific and 1,3-Specific Lipases", Journal of the American Oil Chemists' Society, 72(6):633-639 (1995).
Goto et al., "Enzymatic interesterification of triglyceride with surfactant-coated lipase in organic media", Biotechnology and Bioengineering, 45(1):27-32 (1995).
Nakaya et al., "Transesterification between triolein and stearic acid catalyzed by lipase in CO2 at various pressures", Biotechnology Techniques, 12(12):881-884 (1998).
Seriburi et al., "Enzymatic transesterification of Triolein and Stearic acid and solid fat content of their products", Journal of the American Oil Chemists' Society, 75(4):511-516 (1998).
European Search Report for European Patent Application No. 05255492.0, Jan. 26, 2006.
Filer et al., "Triglyceride Configuration and Fat Absorption by the Human Infant" J. Nutrition, 99:293-298, Nov. 1969.
Freeman et al., "Intramolecular fatty acid distribution in the milk fat triglycerides of several species" J. Dairy Sci., 48:853-858 (1965).
English translation of Office Action issued in 2010 in corresponding Chinese patent application 200680033013.2.
Nakaya et al., Transesterification between triolein and stearic acid catalyzed by lipase in CO2 at various pressures, Biotechnology Techniques, 12(12):881-884 (1998).
Chen et al., "Synthesis of the structured lipid 1,3-Dioleoy1-2-palmitoylglycera from palm oil", Journal of the American Oil Chemists' Society, 91(6):525-532 (Jun. 2004).
Goto et al., "Enzymatic Interesterification of Triglyceride with Surfactant-Coated Lipase in Organic Media", Biotechnology and Bioengineering, 45(1):27-32 (Jan. 5, 1995).

* cited by examiner

*Primary Examiner* — Herbert J Lilling
(74) *Attorney, Agent, or Firm* — Morgan, Lewis & Bockius LLP

(57) ABSTRACT

A process for the production of a composition comprising 1,3-dioleyl-2-palmitoyl glyceride (OPO) comprises subjecting a palm oil stearin, with an iodine value (IV) between about 2 and about 12 to enzymic transesterification, with oleic acid or a non-glyceride ester thereof.

12 Claims, No Drawings

PROCESS FOR PRODUCING A TRIGLYCERIDE

This invention relates to a process. In particular, the invention relates to a process for the production of the triglyceride 1,3-dioleoyl-2-palmitoyl glyceride (also referred to as OPO).

Triglycerides are important components of many products, especially food products. The triglyceride 1,3-dioleoyl-2-palmitoyl glyceride is an important glyceride component of human milk fat.

Fat compositions containing similar amounts of the principal fatty acids found in human milk fat may be derived from oils and fats of vegetable origin. However, there remains a significant difference in composition between milk replacement fats, derived from natural sources, and that of human milk fat. This difference arises because most glycerides of vegetable origin are unsaturated in the 2-position. In contrast, a substantial amount of palmitic acid occupies the 2-position of glycerides in human milk fat.

The difference in the distribution of acids along the glyceride positions is believed to have important dietary consequences. The distribution of fatty acids in the triglycerides of some milk fats of nutritional importance was studied by Freeman et al, (*J. Dairy Sci.,* 1965, p. 853), who reported that human milk fat contains a greater proportion of palmitic acid in the 2-position, and a greater proportion of stearic acid and oleic acid in the 1,3-positions than the milk fat of ruminants. The greater absorption of palmitic acid in the 2-position of triglycerides by infants was reported by Filer et al (*J. Nutrition*, 99, pp. 293-298), who suggest that the relatively poor absorption of butter fat by infants compared with human milk fat is attributable to its substantially uniform distribution of palmitic acid between the glyceride positions of the fat.

In order to most closely match the chemical and/or physical properties of triglyceride fats or oils obtained from natural sources, to that of human milk fat, therefore, it is necessary to control the distribution of the fatty acid residues on the glyceride positions.

EP-A-0209327 discloses milk replacement fat compositions comprising the triglyceride 1,3-dioleoyl-2-palmitoyl glyceride (OPO). According to EP-A-0209327, these fat compositions can be obtained by subjecting fatty mixtures comprising glycerides consisting substantially of more saturated 2-palmitoyl glycerides to a rearrangement catalyst, such as a lipase, which is regiospecific in activity in the 1- and 3-positions of the glycerides. Enzymatic processes of this kind are also described in GB 1577933. Under the influence of the catalyst, unsaturated fatty acid residues may be introduced into the 1- and 3-positions of the 2-palmitoyl glycerides by exchange with unsaturated free fatty acids or their alkyl esters.

WO 2005/036987 discloses a process for producing a fat base by reacting a palmitic rich oil with unsaturated fatty acids such as oleic acid. The total palmitic acid residue content of the fat base is at most 38% and at least 60% of the fatty acid moieties are in the 2-position of the glyceride backbone. A related disclosure can be found in WO 2005/037373, filed on the same day.

A process for producing OPO is also disclosed in U.S. Pat. No. 5,658,768. The process involves a further enzymic conversion to reduce the level of trisaturates in the composition.

EP-A-0882797 describes a process for producing ABA triglycerides using a 1,3-specific enzyme, under controlled conditions of water activity.

A selective process for producing OPO triglycerides is disclosed in Schmid et al, Biotechnology and Bioengineering, vol 64, no 6, 1999, 679-684. The synthesis of OPO from palm oil is described in Ming-Jung et al, JAOCS, vol 81, no 6, 2004, 525-532. In both cases, the OPO was synthesised from tripalmitin (PPP).

There remains a need to provide a more efficient process for the production of 1,3-dioleoyl-2-palmitoyl glyceride (OPO).

The present invention provides a process for the production of a composition comprising 1,3-dioleyl-2-palmitoyl glyceride (OPO), wherein the process comprises subjecting a palm oil stearin, with an iodine value (IV) between about 2 and about 12 to enzymic transesterification, with oleic acid or a non-glyceride ester thereof (such as an alkyl ester of oleic acid with an alcohol having from 1 to 6 carbon atoms).

In one embodiment, the process of the invention comprises:
(i) providing a palm oil stearin comprising tripalmitoyl glyceride and having an iodine value of between about 2 and about 12;
(ii) optionally bleaching and deodorising the palm oil stearin;
(iii) subjecting the palm oil stearin to enzymic transesterification with oleic acid or a non-glyceride ester thereof;
(iv) separating palmitic acid or palmitic non-glyceride esters from the product obtained in (iii); and
(v) optionally dry fractionating the product obtained in (iv) to form a fraction comprising an increased amount of OPO.

The process of the invention aims to increase the amount of OPO formed in the product of the process. A further aim of the process is an increase in the nutritional quality of the product Unexpectedly, it has been found that the process does not work well when palm oil stearin having a higher purity in tripalmitoyl glyceride (such as that having an iodine value (IV) of less than 1) is used. Without wishing to be bound by theory, the inventors believe that this might be due to poor enzymic transesterification, possibly due to enzyme inhibition. Surprisingly, however, it has been found that good results are achieved using palm oil stearin that is less pure in tripalmitoyl glyceride and has an iodine value of typically between 2 and 12, preferably between 3 and 11, more preferably between 4 and 11, in particular between 6 and 11, such as from 8 to 10, or between 8 and 10. Iodine value is determined according to standard methods known in the art (e.g., ASTM D5554-95 (2001)).

The quality of the OPO composition can be determined from the carbon number of the constituent triglycerides in the composition. The reactant glyceride for the process is PPP, having a carbon number of 48 (C48), the product OPO has a carbon number of 52 and OPP and OOO have carbon numbers of 50 and 54, respectively. It is desirable to minimise the OOO, PPP and OPP levels in the product, whilst maximising the amount of OPO. The presence of palmitoyl groups (i.e., palmitic acid residues) in the 2-position of the glyceride is particularly important. However, in determining the quality of the product, it is necessary to take into account the known poor digestibility of 1- and 3-palmitoyl glycerides, such as PPP and OPP. Thus, the quality of the product can be expressed by multiplying the amount of triglycerides other than C54 i.e., (100−54) by the ratio of total (C48+C50+C52) to ((3×C48)+(2×C50)+(C52)), which includes a factor for the number of palmitoyl residues in the triglyceride, and/or by the amount of palmitic acid residues in the 2-position of the glyceride.

The composition or faction produced by the process of the invention preferably has a value for the ratio:

$$(100-C54) \times [(C48+C50+C52)/(3C48+2C50+C52)]$$

of greater than 50, more preferably from 52 to 60, such as from 53 to 59, or from 54 to 58, or 55 to 57, or 56 to 57. The carbon numbers, C48 to C54, are preferably determined by the method set out in the examples.

A suitable source of tripalmitoyl glyceride (PPP) for use in the process of the invention is palm oil stearin. Palm oil typically contains up to 12% by weight trisaturated acid glycerides including tripalmitoyl glyceride (PPP; also referred to as tripalmitin). Palm oil stearin may contain 4 parts tripalmitin and 1 part of symmetrical disaturated triglycerides, by weight Preferably, therefore, the palm oil stearin used in part (i) of the process is provided by fractionating palm oil or a derivative thereof. The palm oil stearin preferably has a palmitic acid content of at least 60% by weight, more preferably at least 70% by weight, such as at least 75%, at least 80% or at least 85% by weight e.g., at least 90% by weight, based on the total fatty acid residue content.

The palm oil stearin used in step (i) of the process of the present invention may be obtained from solvent (wet) fractionation, Lanza fractionation, or dry fractionation of palm oil, such as multi-stage counter current dry fractionation of palm oil. The palm oil can be crude palm oil, refined palm oil, fractions of palm oil (e.g., obtained by dry fractionation), other derivatives of palm oil, or mixtures thereof.

The palm oil stearin used in step (i), preferably comprises 2-palmitoyl glycerides, typically in an amount of greater than 50% by weight, such as greater than 55% by weight or greater than 60% by weight.

The palm oil stearin has an iodine value (IV) of between about 2 and about 12, preferably between about 4 and about 11, more preferably between about 6 and about 11, such as from about 8 to about 10.

Before the palm oil stearin is subjected to enzymic esterification, the palm oil stearin is typically refined in optional step (ii), which preferably involves bleaching and deodorising. The bleaching of the palm oil stearin in the process of the invention is performed above 95° C., more preferably above 100° C. (such as at from 105° C. to 120° C.). In the deodorising step, volatile impurities are removed from the palm oil stearin to yield deodorised palm oil stearin, typically at temperatures above 200° C. The impurities removed in the deodorising step commonly include free fatty acids, aldehydes, ketones, alcohols and other hydrocarbon impurities. The bleaching and deodorising are performed under standard conditions known in the art and may be carried out in a single process step or two or more process steps. For example, the steps may be carried out at reduced pressures (e.g., 10 mm Hg or below), wherein the palm oil stearin is contacted with steam to help vaporise the impurities. Bleaching and deodorising the palm oil stearin may help to improve the yield of the process.

The term "stearin", as used in this specification, includes a triglyceride mixture or fat blend from which at least 10% by weight of the lower melting constituents have been removed by some kind of fractionation, e.g., dry fractionation, Lanza fractionation or solvent fractionation. Correspondingly, the term olein refers to a triglyceride mixture or fat blend from which at least 10% by weight of the higher melting constituents have been removed by some kind of fractionation, e.g., dry fractionation, Lanza fractionation or solvent fractionation.

The terms fatty acid, fatty acyl groups, and related terms used herein refer to saturated or unsaturated, straight chain carboxylic acids having from 4 to 24 carbon atoms, preferably from 12 to 22 carbon atoms. Unsaturated acids may comprise one, two, or more double bonds, preferably one or two double bonds.

The term alkyl as used herein, refers to straight chain or branched saturated hydrocarbons having from 1 to 6 carbon atoms.

The enzymic transesterification according to the process of the present invention is preferably carried out using a 1,3 specific lipase as a biocatalyst. In the enzymic transesterification, the fatty acids on the 2-position of the triglycerides typically do not change (for example, less than 10% by moles of fatty acyl groups in the 2-position, more preferably less than 5%, such as less than 1%, change during the process).

Under the influence of a 1,3 lipase, unsaturated fatty acid residues may be introduced into the 1- and 3-positions of the 2-palmitoyl glycerides by exchange with the fatty acid residues of other glycerides or more preferably by means of transesterification in the fatty mixture. Exchange preferably takes place between unsaturated free fatty acids, preferably oleic acid, or alkyl esters of oleic acid with alcohols having from 1 to 6 carbon atoms. The 2-palmitoyl glycerides modified in this way may be separated from the reaction mixture.

The enzymic transesterification reaction in the process of the present invention selectively exchanges palmitic acid with oleic acid on the 1,3-position rather than the 2-position. The transesterification reaction is typically performed to reach or approach equilibrium at a conversion ratio of a minimum of at least 50%, preferably at least 60%, most preferably at least 70%.

Preferably, in the transesterification reaction, the palm oil stearin is, for example, mixed with an oleic acid concentrate (comprising free oleic acid at a concentration of greater than 65% by weight, preferably greater than 70% by weight, most preferably greater than 75% by weight). Alternatively, the oleic acid may be provided as a mixture comprising oleic acid (preferably in an amount of greater than 65% by weight), linoleic acid and, optionally, one or more other fatty acids. The ratio of palm oil stearin to oleic acid concentrate is preferably from 0.1:1 to 2:1, more preferably from 0.4:1 to 1.2:1, even more preferably from 0.4:1 to 1:1, most preferably from 1:1.1 to 1:2 on a weight basis. The reaction is preferably carried out at a temperature of from 30° C. to 90° C., preferably from 50° C. to 80° C., such as about 60° C. to 70° C., and may be conducted batchwise or in continuous fashion, with or without a water-immiscible organic solvent.

Before the enzyme transesterification reaction, the humidity is preferably controlled to a water activity between 0.05 and 0.55, preferably between 0.1 and 0.5, depending on the type of biocatalyst enzyme system used. The reaction may be performed, for example, at 60° C. in a stirred tank or in a packed bed reactor over biocatalysts, based on concentrates of Lipase D (*Rhizopus oryzae*, previously classified as *Rhizopus delemar*, from Amano Enzyme Inc., Japan) or immobilised concentrates of *Rhizomucor miehei* (Lipozyme RM IM from Novozymes A/S, Denmark).

In order to separate palmitic acid and other fatty acids or palmitic non-glyceride esters and other glycerides from OPO in (iv), the transesterified mixture (optionally after further treatment, such as isolation of the fat phase) is preferably distilled. Distillation is preferably carried out at low pressure (e.g., lower than 10 mbar) and elevated temperatures (e.g., greater than 200° C.) to remove the fatty acids from the product triglyceride fraction.

The composition obtained in (iv) is preferably fractionated in (v) to recover an olein fraction (i.e., a lower melting fraction). This can be done using solvent fractionation, Lanza fractionation or dry fractionation, using a single, two-step or multi-step fractionation technique, but is preferably carried out using single step dry fractionation. The olein can also be obtained by subjecting the transesterified mixture to multi-stage counter current dry fractionation.

Fractionation of the triglyceride fraction removes the unconverted tripalmitin (PPP) down to a level of less than 15 weight %, preferably less than 10 weight %, most preferably less than 8 weight %. The olein fraction, obtained after step (v), is typically further refined or purified to remove all remaining fatty acids and contaminants to produce a refined olein fraction.

Surprisingly, it has been found that using a palm oil stearin having an iodine value within the range of the invention may mean that the further fractionation of the product in (v) is unnecessary for a satisfactory product.

The process may optionally comprise further steps before, between or after (i) to (v), such as partial purification or enrichment of the products in the desired component(s).

The composition obtained after (iv) or the fraction comprising an increased amount of OPO glyceride obtained after (v) in the process of the invention preferably comprises at least 10% by weight OPO, more preferably at least 15%, even more preferably at least 20%, such as at least 25% or 30% or even 40% by weight OPO based on total glycerides in the fraction. The balance typically comprises other non-OPO triglycerides, and may further contain minor amounts of diglycerides and monoglycerides. Minor amounts of free fatty acids may also be present. The fraction is preferably a composition which comprises a mixture of triglycerides wherein different fatty acid residues, including unsaturated fatty acid residues, are randomly distributed between the 1- and 3-positions and at least half of the fatty acid residues in the 2-positions are C16 and/or C18 saturated, preferably consisting substantially of palmitic acid residues, in particular 60-90% by weight of the total 2-position fatty acids are preferably palmitic acid. Preferably, all of the fatty acid residues, or virtually all (e.g., greater than 99% by weight), in the glycerides of the composition are even-numbered. The unsaturated fatty acid residues in the 1- and 3-positions preferably consist largely of oleic acid and linoleic acid. The compositions preferably includes at least as much (on a molar basis) of saturated fatty acid in the 2-position as in the 1- and 3-positions combined, more preferably up to twice as much (on a molar basis). Preferably, the 1,3-positions include both unsaturated C18 and saturated C4 to C14 fatty acids.

The proportion and type of these fatty acids may be determined in accordance with dietary and physical requirements of the composition required. For example, milk replacement fats should be capable of emulsification at blood heat in liquid feed and should therefore preferably be capable of being melted at this temperature (37° C.). The melting point of fats is determined by their fatty acid composition, which may be selected accordingly. Fats with the correct fatty acid composition may be selected for use in the present invention, therefore, with a view to producing fat compositions with certain desired physical characteristics.

The most preferred compositions produced by the present invention are those comprising triglycerides having at least 40%, more preferably at least 45%, such as at least 50% by weight palmitic acid present in the 2-position of the glyceride, based on the weight of total fatty acid residues present. Additionally or alternatively, the compositions may comprise less than 8% by weight SSS glycerides (wherein S represents saturated fatty acid having at least 18 carbon atoms, preferably 18 carbon atoms) based on total weight of triglycerides, and at least 40% by weight oleic acid residues in the 1- and 3-positions, based on the weight of total fatty acid residues present.

It is preferred that the fat composition produced by the process of the invention has palmitic acid groups at the 2-position of the glyceride (an "SN-2 value") in an amount of at least 50%, more preferably at least 52%, even more preferably at lerast 53%, such as at least 54% or at least 55% or at least 56%. An SN-2 value of x % means that of the total palmitic acid residues in the glyceride, x % (by weight or moles) are in the 2-position and (100–x) % of the palmitic acid residues are distributed between the 1- and 3-positions of the glyceride. This value is preferably determined as described in the method set out in Example 2.

The composition obtained by the process of the present invention contains preferably less than 10% by weight 1,2,3-trisaturated glycerides, preferably less than 8% by weight 1,2,3-trisaturated glycerides.

The invention may comprise an additional step of further purifying the product in OPO.

The process of the present invention may, additionally or alternatively, comprise the further step (vi) of blending the OPO fraction with other fats and/or oils, preferably with at least one vegetable oil, to form a fat blend. Suitable fats are fats comprising: up to 40% by weight of medium-chain triglycerides; up to 30% by weight of lauric fats; up to 50% by weight of other vegetable fats; or up to 40 wt % of butterfat; or fractions or mixtures of these fats. In particular, lauric fats, preferably palm kernel oil, may be included in the compositions to provide blends aiming to match the compositions of milk fat or its melting characteristics, and/or vegetable oils such as sunflower oil, high oleic sunflower oil, palm kernel oil, rapeseed oil and soybean oil, coconut oil, high oleic safflower oil which have a high content of polyunsaturated fatty acid glycerides, which improve the dietary benefit of the compositions, may be included. In this way, the compositions produced by the process of the invention preferably provide blends matching the composition of milk fat or its melting characteristics. The resulting blends preferably have a Solid Content Index measured by NMR-pulse on non stabilised fats are within the following ranges: NO=35-55; N10=25-50 and N30</=10. These values were preferably obtained by melting the fat at 80° C., holding the fat at 60° C. or higher for at least 10 minutes, cooling to 0° C. and holding the fat at 0° C. for 16 hours, heating the fat to the measurement temperature N and holding the fat at that temperature for 30 minutes before measuring the N value.

The fat compositions or fat blends produced by the process of the invention are suitable for replacing at least a part of the fat in infant food formulations. The present invention also therefore provides for a method for the production of infant food compositions comprising fat, protein and carbohydrate components in the approximate relative weight proportions 2.5:1:5, wherein at least a part of the fat normally used in such formulations is replaced by the fat composition or fat blend made in accordance with the present invention. Dry formulations containing this mixture, together with additional components customary in such formulations, should be dispersed for use in sufficient water to produce an emulsion of approximately 3½ grams of fat per 100 ml of dispersion. Therefore, in another aspect, the invention provides a method of producing an infant food formulation by pang and labelling the composition comprising OPO triglyceride obtained after step (v) or step (vi) of the process.

The following non-limiting examples illustrate the invention and do not limit its scope in any way. In the examples and throughout this specification, all percentages, parts and ratios are by weight unless indicated otherwise.

EXAMPLES

Example 1 a) Production of a Refined Olein Fraction

Palm oil stearin was produced by dry or solvent fractionation of palm oil to create a fraction with a palmitic acid concentration higher than 78% and an iodine value lower than 14 meqO$_2$/kg (IV=14).

The palm oil stearin was physically refined (bleached and deodorised). After refining, the palm oil stearin was mixed with an oleic acid concentrate (C18:1 concentration >75%). The ratio of palm oil stearin to oleic acid concentrate was between 1.2 to 2 on weight basis. The mixing ratio was determined by the activity of the enzymes, the quality of the palm oil stearin and the quality of the oleic acid (concentration of palmitic and oleic acids).

Before reaction, the humidity was controlled carefully at a water activity between 0.1 and 0.5, depending on the type of biocatalyst enzyme system used. The reaction was performed at 60° C. in a stirred tank or in a packed bed reactor over biocatalysts, based on concentrates of Lipase D (*Rhizopus oryzae*, previously classified as *Rhizopus delemar*, from Amano Enzyme Inc., Japan) or immobilised concentrates of *Rhizomucor miehei* (Lipozyme RM IM from Novozymes A/S, Denmark). The enzymic transesterification reaction selectively exchanges palmitic acid with oleic acid on the 1,3-position rather than the 2-position. The reaction was performed to reach an approach to equilibrium of a minimum of 70% exchange.

After reaction, the fatty acids were removed from the product triglyceride fraction by distillation at low pressure (<10 mbar) and elevated temperatures (>200° C.). The triglyceride fraction was dry fractionated to remove the unconverted tripalmitines down to a level of maximum 6 weight %. The olein fraction was fully refined to remove all remaining fatty acids and contaminants to produce a refined OPO composition.

b) Preparation of Human Milk Fat Replacer

The base olein fraction was mixed with a number of vegetable oils (rape seed, corn oil, coconut oil, palm kernel oil, sunflower oil) to produce a mixture with a similar fatty acid composition as human milk fat.

Example 2

Acidolysis of various palm oil stearin (POS) fractions having different iodine values (IV) was performed over immobilised Lipase D as catalyst at a water activity of 0.3 to 0.4 at 60° C. in a packed bed reactor to approach 90% equilibrium, using an oleic acid to POS-ratio of 1.2 to 1.6. C48 to C54 levels were determined by capillary gas chromatography according to method AOCS Ce 5-86 "Triglycerides by GC". The results were as follows:

|  | POS IV-4 | POS IV-8 | POS IV-10 | POS IV-12 |
| --- | --- | --- | --- | --- |
| IV Feedcomposition | 3.8 | 8.6 | 10 | 11.6 |
| C48 | 73.6 | 69.7 | 69.0 | 63.3 |
| C50 | 18.2 | 20.2 | 19.5 | 23.7 |
| C52 | 3.0 | 5.7 | 6.4 | 8.1 |
| C54 | 1.3 | 1.3 | 1.8 | 1.9 |

The product after acidolysis had the following composition:

| Composition | POS IV-4 | POS IV-8 | POS IV-10 | POS IV-12 |
| --- | --- | --- | --- | --- |
| C48 | 20.8 | 12.8 | 9.2 | 8.5 |
| C50 | 40.6 | 37.5 | 35.6 | 33.8 |
| C52 | 31.8 | 39.8 | 44.3 | 44.5 |
| C54 | 5.3 | 8.8 | 9.8 | 11.6 |
| SN-2* | 49 | 53 | 57 | 52 |
| (100-C54) *(C48 + C50 + C52)/(3*C48 + 2*C50 + C52) | 50.32 | 53.64 | 56.16 | 55.76 |

*percentage of palmitic acid residues in the 2- position, determined by finding: (a) the total C16:0 content of the fat by FAME (surface internal standard C17:0); and (b) the C16:0 content of the 2- position by FAME (same standard) of a sample of the fat after hydrolysis of the 1- and 3- residues using pancreatic lipase to form a 2-monoglyceride. The SN-2 value is ((b) × 100)/((a) × 3).

The product was fractionated at about 35° C. The fractionated product had the following composition:

| Composition | POS IV-4 | POS IV-8 | POS IV-10 | POS IV-12 |
| --- | --- | --- | --- | --- |
| C48 | 8.1 | 5.4 | Not further fractionated due to quality of product | 7.4 |
| C50 | 44.2 | 38.5 | | 34.6 |
| C52 | 39.8 | 44.9 | | 45.1 |
| C54 | 6.6 | 10.3 | | 11.5 |
| SN-2 | 55 | 56 | | 55 |

The invention claimed is:

1. A process for the production of a composition comprising 1,3-dioleoyl-2-palmitoyl glyceride (OPO), wherein the process comprises subjecting a palm oil stearin, with an iodine value (IV) between about 8 and about 11 to enzymic transesterification, with oleic acid or a non-glyceride ester thereof.

2. A process as claimed in claim 1 comprising:
   (i) providing a palm oil stearin comprising tripalmitoyl glyceride;
   (ii) optionally bleaching and deodorising the palm oil stearin;
   (iii) subjecting the palm oil stearin to enzymic transesterification with oleic acid or a non-glyceride ester thereof;
   (iv) separating palmitic acid or palmitic non-glyceride esters from the product obtained in (iii) to form a composition comprising OPO glyceride; and
   (v) optionally dry fractionating the product obtained in (iv) to form a fraction comprising an increased amount of OPO.

3. A process according to claim 1 or claim 2, wherein the palm oil stearin is provided by fractionating palm oil or a derivative thereof.

4. A process according to claim 3, wherein the palm oil stearin is provided by the dry fractionation of palm oil.

5. A process according to claim 1, further comprising the step of blending the composition of (iv) or the fraction of (v) with at least one vegetable oil.

6. A process according to claim 5, wherein the vegetable oil is selected from sunflower oil, high oleic sunflower oil, palm kernel oil, rapeseed oil and soybean oil.

7. A process according to claim 1, wherein the composition or fraction comprises at least 50 wt % of palmitic acid residues present in the 2-position of the glyceride, based on the weight of total fatty acid residues present in the 2-position of the glyceride, less than 8% by weight SSS glycerides (wherein S represents saturated fatty acid having at least 18 carbon atoms) based on total weight of triglycerides, and at least 40% by weight oleic acid residues in the 1 and 3 positions, based on the weight of total fatty acid residues present in the 1 and 3 positions.

8. A process according to claim 1, wherein the composition or fraction comprises less than about 8 weight % trisaturated glycerides.

9. A process according to claim 1, wherein the palm oil stearin is bleached at a temperature above 95° C.

10. A process according to claim 1, wherein the palm oil stearin has an iodine value of from about 8 to about 10.

11. A process according to claim 1, wherein the composition or fraction has a value for the ratio: $(100-C54)\times[(C48+C50+C52)/(3C48+2C50+C52)]$ of greater than 50.

12. A process as claimed in claim 11, wherein the ratio has a value of from 52 to 57.

* * * * *